INVENTOR.
MARLIN ELLER

INVENTOR.
MARLIN ELLER

July 26, 1966   M. ELLER   3,262,689
PIPE CUTTING MACHINE
Filed Oct. 23, 1963   4 Sheets-Sheet 3

INVENTOR.
MARLIN ELLER
BY
ATTORNEY

July 26, 1966  M. ELLER  3,262,689

PIPE CUTTING MACHINE

Filed Oct. 23, 1963  4 Sheets-Sheet 4

INVENTOR.
MARLIN ELLER
BY
ATTORNEY

United States Patent Office 3,262,689
Patented July 26, 1966

3,262,689
PIPE CUTTING MACHINE
Marlin Eller, 292 N. Dixie Highway, Deerfield Beach, Fla.
Filed Oct. 23, 1963, Ser. No. 318,417
5 Claims. (Cl. 266—23)

This invention relates to a pipe cutting machine and whereby to cut segments from a pipe to form multiple sections that are subsequently welded together to form elbows for connecting a pair of conduits that are disposed in any degree of angularity.

The invention further has for its object to present an apparatus adapted for use in cutting pipe of various kinds and sizes by means of an acetylene torch or the like, on proper lines for assembly of joint sections to be united by welding, and especially for formation of joints between pipe sections cut to a proper form in accordance with geometrical development of the proper plane within which the joints are to be made.

It is a practice in the construction of pipe systems and also to a large extent in forming special pipe bends in large pipes, to build up the necessary bends by cutting sections from plane rectilinear pipe in planes adapting them to be butted end to end to form the completed bend. In some instances where a 90 degree angle is involved and friction will flow through the pipe, it is an immaterial factor, the bend may be made by joining two or more pipe sections at a right angle to each other. Other cases however it is found desirable to use three or more sections showing more or less how a rounded bend is formed.

Another object of the invention is to provide a novel means for effecting the necessary movements of a torch and the work relatively, so as to simultaneously effect the movement of the torch circumferentially of the work and also to modify the angle of the torch with relation to incident longitudinal elements of the work during the cutting operation.

Another object of the invention is to present an apparatus of this kind which may be quickly and accurately adjusted to vary the lengths of the sections to be cut, as well as the plane and angle of the cut and to present apparatus which may be quickly adjusted with great certainty to produce desired forms and angles with respect to the sections constituting the bend of the pipe.

Figure 1:
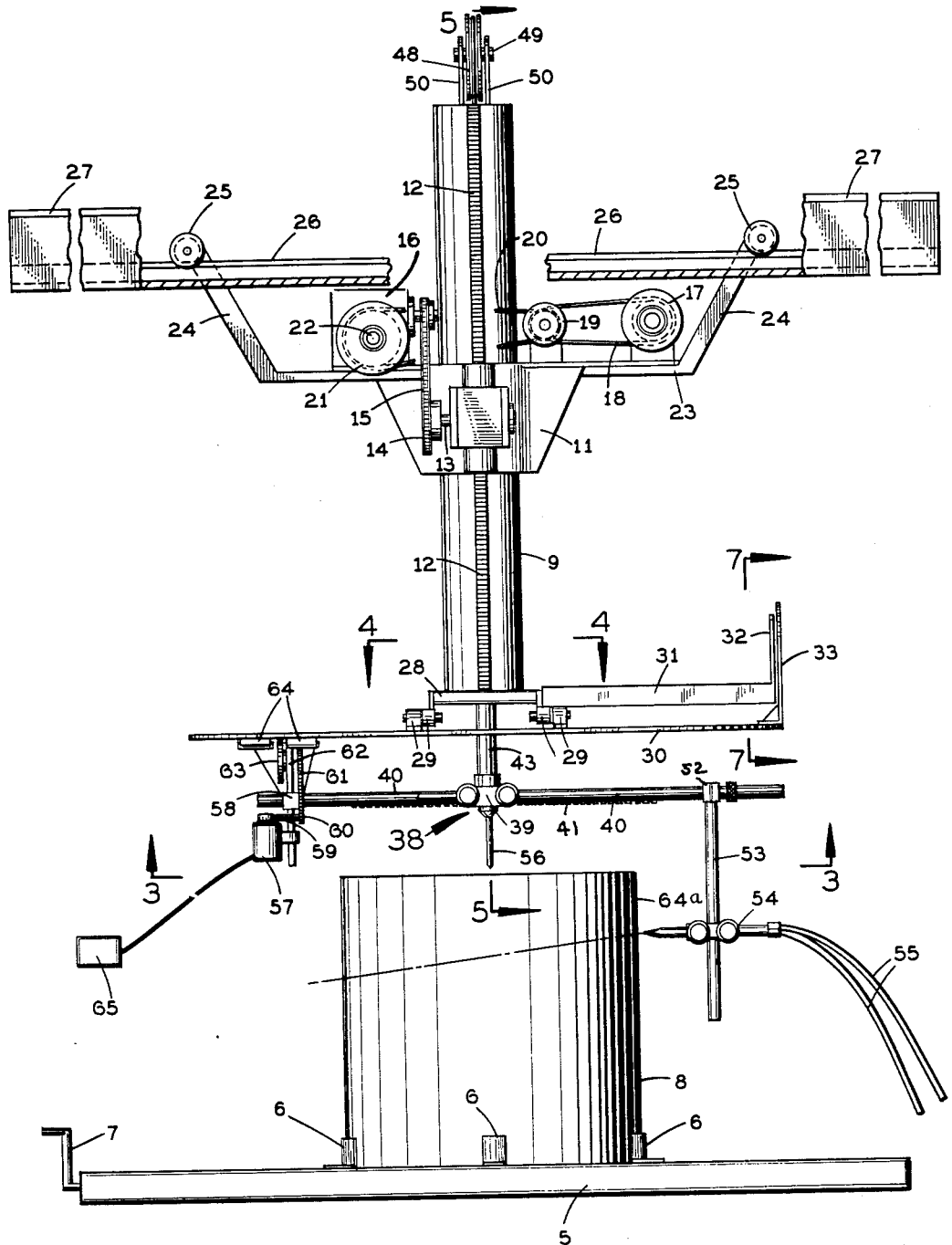
Figure 2:
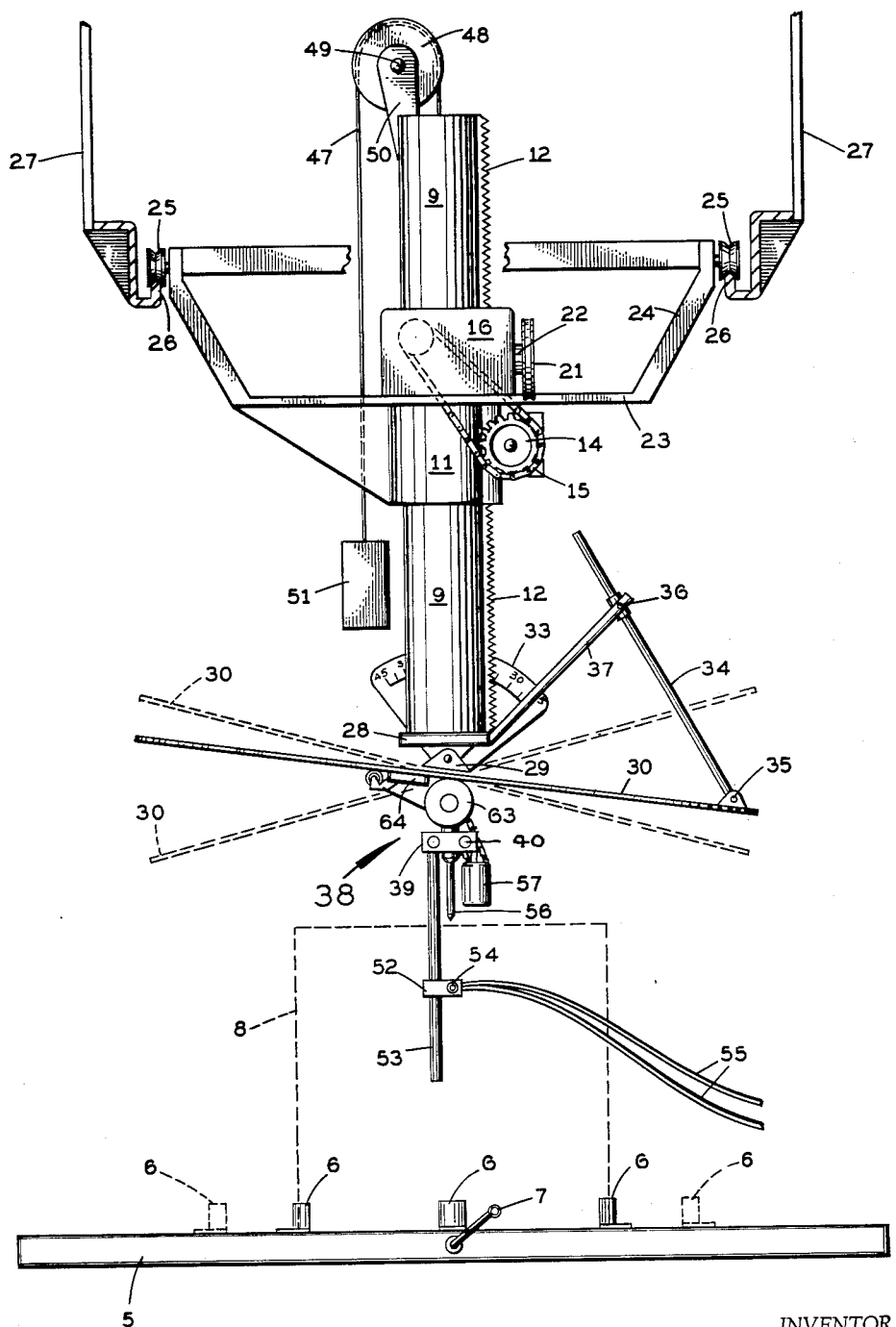
Figure 3:
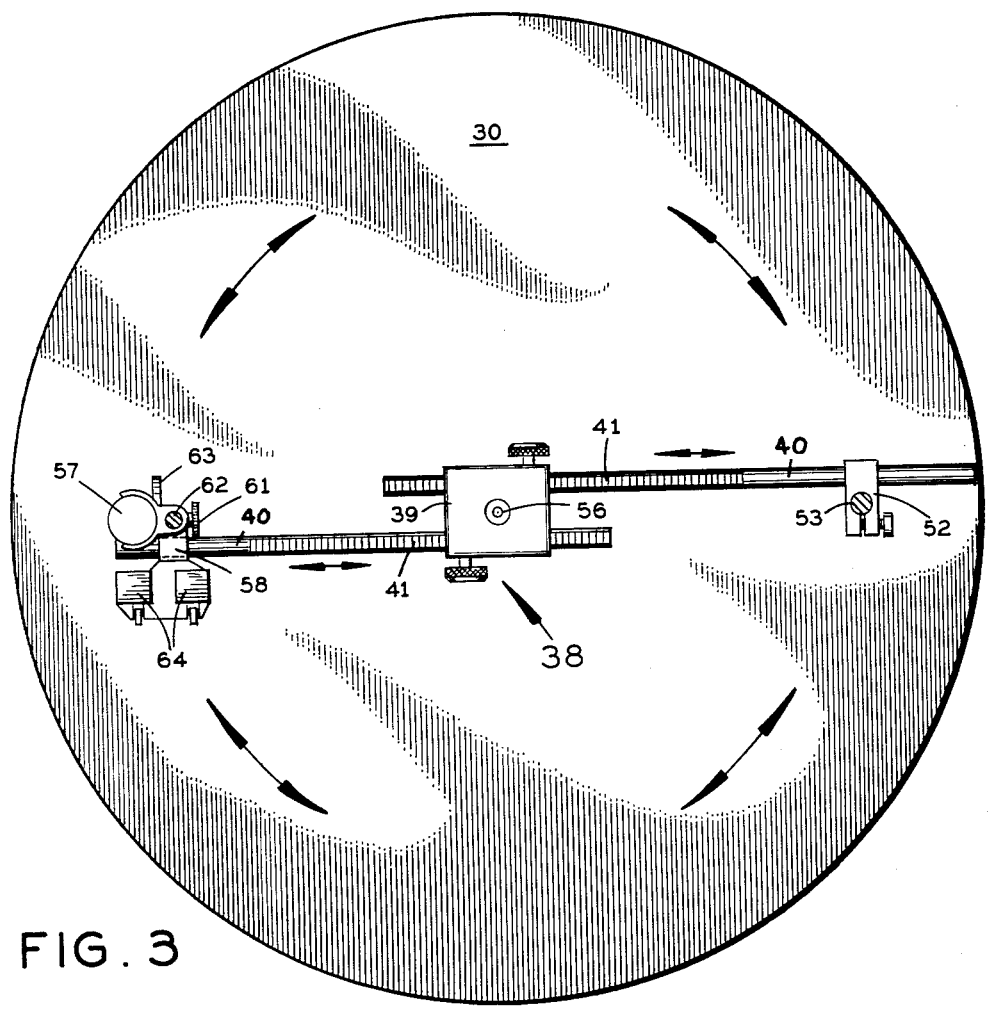
Figure 4:
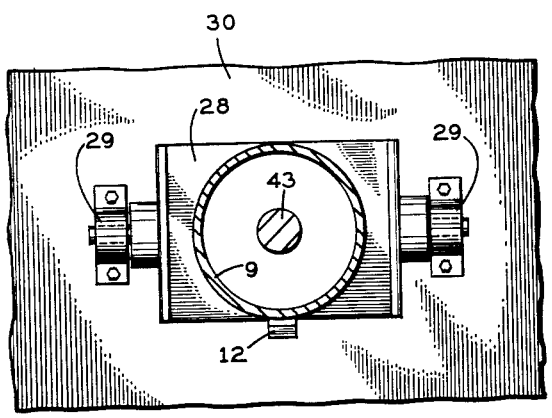
Figure 5:
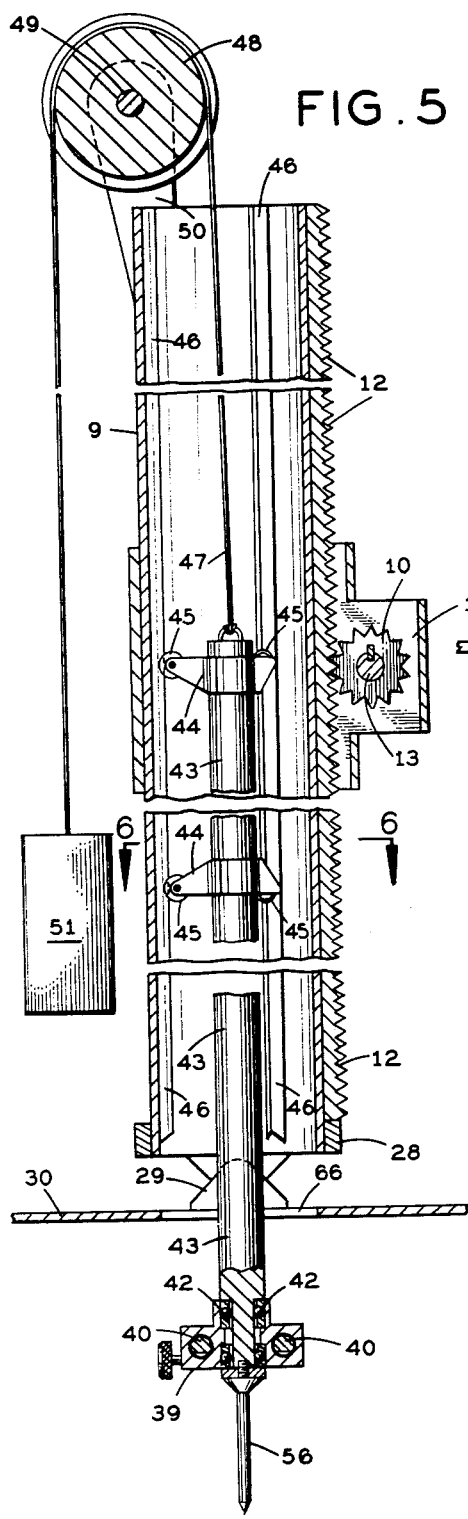
Figure 6:
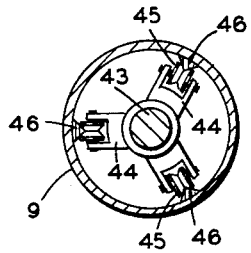
Figure 7:
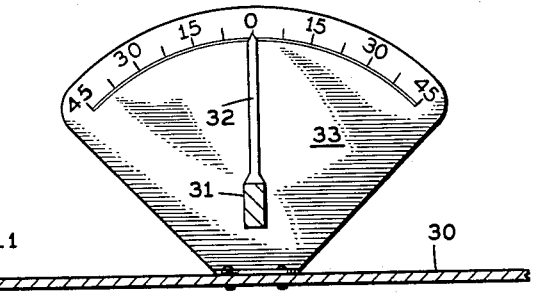
Figure 8:
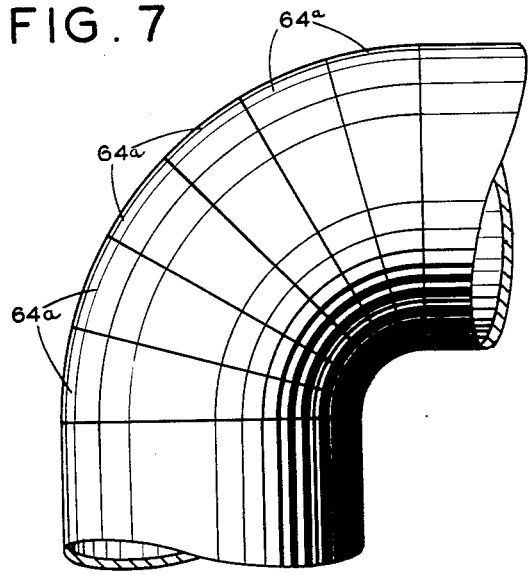

Additional objects, advantages and features of construction, arrangement and combination of parts involved in the embodiment of the invention will be more readily understood from the following description and accompanying drawings, wherein, FIGURE 1 is a side elevation of a machine constructed in accordance with the invention, FIGURE 2 is a side elevation at right angles to FIGURE 1, FIGURE 3 is a bottom plan view taken substantially on line 3—3 of FIGURE 1, FIGURE 4 is a transverse section taken substantially on line 4—4, looking in the direction of the arrows, FIGURE 5 is a vertical section taken substantially on line 5—5 of FIGURE 1, FIGURE 6 is a transverse section taken on line 6—6 of FIGURE 5, FIGURE 7 is a section taken substantially on line 7—7 of FIGURE 1, and FIGURE 8 is a side elevation of a completed elbow having segmental sections that are formed in accordance with the invention.

Referring specifically to the drawings and particularly to FIGURES 1 and 2, there has been provided a fixed base plate 5, such base plate being mounted upon a floor or other support. The base plate is provided with a plurality of adjustable brackets 6 that constitutes the jaws of a chuck of any conventional construction and with the jaws being simultaneously moved inwardly by a handle 7 to clamp a pipe section 8. The pipe section 8 is cylindrical and of any predetermined diameter. The pipe is mounted at a central point with respect to the plate 5 and axially disposed with respect to cutting mechanism, to be hereinafter described. Disposed in vertical alignment with the axial center of the pipe 8 is a tubular standard 9, the standard 9 is shifted in a vertical plane by gear 10, journaled in a bracket 11 and with the gear having meshed engagement with a rack 12 that is fixed to one side of the standard for substantially its entire height. The gear 10 is fixed to a shaft 13 and the shaft beyond the bracket 11 is provided with a sprocket 14, being driven by a sprocket chain 15, that is driven from a reduction gearing device 16. The reduction gearing is driven from a motor 17 by a belt drive 18. The belt drive 18 has an intermediate groove pulley 19 and from the pulley 19, a belt 20 drives a pulley 21 fixed upon a shaft 22 of the reduction gearing 16. The bracket 11 is connected with a carriage 23, having upwardly inclined arms 24, that carry grooved wheels 25. The groove wheels 25 are adapted to traverse trackways 26 that are suitably supported from the ceiling or other super structure by supporting arms 27.

Pivotally connected with a ring 28 at the lower end of the standard 9, as by pivotal bearings 29 is a gauge plate 30. The gauge plate 30 constitutes the guide mechanism for the cutting mechanism to be described. Fixed to the bearing 29, is an arm 31, carrying adjacent its outer end, a pointer 32. The pointer 32 is adapted to move with relation to a calibrated arcuate protractor 33, indicating degrees and whereby the plate 30 may be angularly adjusted, as shown in FIGURE 2. The protractor plate 33 is riveted or otherwise connected to the marginal portion of the plate 30.

The gauge plate 30, being adjustable upon the bearings 29, is adapted to be adjusted to any particular angle as indicated in FIGURE 2. The angular adjustment of the plate 30 is determined by the pointer 32 traversing the protractor 33. When the plate has been set to a predetermined angle, a brace arm 34, pivoted to the plate as indicated at 35 is set in a slide bearing 36 carried by a fixed arm 37. The arm 37 is fixed to the ring 28. The angle of the plate 30 is determined by the operator in accordance with the cut to be made upon the pipe section 8 and the protractor is set accordingly and then the plate is held against further movement by the brace arm 34.

The cutting mechanism indicated as a whole by the numeral 38, embodies a bearing 39 through which is shiftable a pair of spaced apart rods 40. The rods 40, see particularly FIGURE 3 are provided with racks 41 and whereby the rods are movable in opposite directions by a suitable gear within the bearing 39. The bearing 39 is rotatably supported upon ball bearings 42, carried by a vertically extending rod 43. The rod 43 passes upwardly through the standard 9 axially thereto and carries carriages 44, having rollers 45, that are adapted to traverse V-shaped trackways 46 that are fixed to the inner side of the standard 9 in spaced apart relation and whereby to support the rod 43 in an up and down movement, carrying with it the bearing 39 and the rods 40. At its upper end, the rod 43 is connected with a cable 47 that extends upwardly above the top of the standard 9 where its engagement is with a groove pulley 48. The pulley 48 is rotatably supported upon a shaft 49, that is fixed in a bearing bracket 50, rigidly connected to the upper end of the standard. The opposite end of the cable 47 is connected with a balance weight 51 and whereby the cutting mechanism is biased toward the underside of the plate

3

30. One rod 40 carries a clamp 52 adjacent its free end and the clamp 52 supports a vertically extending supporting rod 53. The rod 53 adjustably supports an acetylene torch 54 and with the torch carrying the usual fluid lines 55. As before stated, the torch may be vertically adjusted upon the rod 53 in accordance with the particular angularity of the cut to be made upon the pipe 8. The bearing 39 carries a pointer 56, whereby to accurately dispose the standard and associated mechanism with respect to the pipe 8. The opposite rod 40 carries a driving mechanism that includes a drive motor 57 and with the motor being supported upon a journal bearing 58. A drive shaft 59 from the motor drives a sprocket 60 that functions to drive a relatively large sprocket 61, that is journaled upon a shaft within a fixed bracket 62 carried by the bearing 58. The sprocket 61 drives a friction disc 63 that is adapted to bear against the underside of the plate 30 and whereby the cutting mechanism is rotated around the pipe 8, the friction disc 63 being biased to frictional engagement with the underside of the plate 30 by the weight 51. The disc 63 and associated mechanism is further held in engagement with the underside of the plate 30 by a pair of magnet plates 64 and with the magnets being hingedly connected to the bearing 58 so that they will be effectively floating and at all times being attracted to the underside of the plate 30 and to slide upon the undersurface of the plate 30 to maintain the disc 63 in frictional engagement. Thus, the friction disc 63 and the magnets hold the arms 40, coupled with the balance weight 51 so that the entire cutting mechanism is driven around the bearings 42, partaking of a path determined by the angularity of the plate 30. The rod 43 is thus floatingly mounted within the standard 9 so that the cutting mechanism follows the angularity of the plate 30.

In the use of the device, a pipe section 8 is fixed upon the base 5 by the chuck arms 6. The carriage 23 is then shifted along the rails 26 until the pointer 56 is substantially centered with respect to the pipe 8. It being determined the angle of cut for a particular segment 64a, for forming an elbow such as that indicated in FIGURE 8 and in dotted lines in FIGURE 1, the plate 30 is moved at an angle determined by the pointer 32 on the face of the protractor 33 and the plate then securely fixed by the brace arm 34. The rod 43 is then shifted downwardly in opposition to the weight 51 until the magnet 64 firmly grips the underside of the plate 30. Adjustment of the standard 9 and the cutting mechanism is controllable from the motor 17, operating through the belts 18 and 20 to the reduction gearing 16, and the gear 10 then being driven to shift the standard 9 up or down in accordance with the position of start for the cutting torch 54. This movement is made to start the torch 54 at the minimum width of the segment to be cut. The torch now being ignited and the motor 57 actuated by a suitable switch 65, the entire cutting mechanism is thus rotated about the underside of the plate 30, rising and falling in accordance with the angularity of the plate and balanced by the weight 51. The friction disc 63 will ride upon the underside of the plate 30 and carry with it, the arms 40 and the rod 53, carrying the torch 54. The cutting mechanism will thus travel upon the underside of the plate 30 a full 360 degrees, thus severing a segment 64a with a clean cut and with the cut, when assembled with respect to other segments 64a will require no grinding to remove any rough edges and the segments when in assembled relation, as shown in FIGURE 8 can be completely welded together to form an elbow or other coupling means for pipes that are to be joined together. As a segment is removed, the standard is lowered for the next circumferential cut and shift the plate 30 to the opposite angle and each segment will have identically the same angle. This is continued until the pipe 8 has been cut to form a predetermined number of the segments 64a. The cutting mechanism carried by the rod 43 is thus floating beneath the plate 30 and biased upwardly by the weight 51. The adjustment of the standard 9 is such that the standard and associated mechanism can be shifted upwardly to accommodate the cutting mechanism to relatively high sections of pipe 8 and gradually adjusted downwardly by the rack 12 in accordance with the position of the torch 54 at a starting point upon the pipe 8.

It will be apparent from the foregoing that a very novel cutting mechanism has been provided for cutting angular sections from a cylindrical pipe 8. The angularity of the sections being first determined by the operator. The mechanism is relatively simple, is strong, durable and highly effective for accurately cutting segments from a pipe and, when the angularity of the segments is determined, the device may be adjustable downwardly for cutting additional segments and for each additional segment, the cut will be at an identical angle in accordance with the gauge plate 30. The plate 30 is centrally apertured at 66, to permit the swinging movement of the plate and to form a clearance for the rod 43 at any degree of angle to which the plate 30 is set.

It is to be understood that the invention is not limited to the precise construction shown, but that changes are contemplated as readily fall within the spirit of the invention as shall be determined by the scope of the subjoined claims.

I claim:

1. A pipe cutting machine for cutting segments from a cylindrical pipe section for forming a multiple segment elbow to form a connection between elongated pipe sections having an identical diameter to the elbow, the machine embodying a fixed base for supporting a pipe section in a vertical manner and with the base being provided with a chuck for rigidly supporting the pipe section to be cut, a cutting mechanism that includes a vertically arranged standard of tubular form, means for adjusting the standard toward and from the pipe section and whereby the standard is axially disposed to the pipe, a circular gauge plate that is hingedly connected to the lower end of the standard to be swung in a vertical plane, a protractor whereby the plate is adjusted to a particular angle, a carriage for movably supporting the standard, cutting means disposed below the gauge plate, counterbalanced means adapted to traverse the standard and to project below the plate, the said cutting means comprising a pair of rods, one rod at its outer end carrying an acetylene cutting torch and the other rod having propulsion means at its outer end, the counterbalanced means biasing the rods and the torch and the propulsion means toward the bottom of the gauge plate throughout all degrees of angularity of the plate and whereby the rods with the torch and under the influence of the propulsion is caused to rotate in a horizontal plane and to rise and fall and to follow the angularity of the plate.

2. A pipe cutting machine of the character described for circumferentially cutting angular segments from a pipe section for forming elbows or the like, the machine embodying a fixed base for supporting the pipe section to be cut, chuck means for clamping the pipe upon the base in a vertical manner, the machine also embodying a vertically extending standard of tubular form and that is open at its upper and lower ends, a carriage device that is connected to the standard and with the carriage device being supported upon trackways, whereby the standard may be shiftable for proper alignment with the pipe section to be cut, the standard being vertically adjustable, the standard at its lower end being provided with a pair of oppositely disposed hinge elements, a gauge plate that is supported by the hinge elements and whereby the gauge plate may be angularly adjusted from a horizontal plane, a protractor carried by the gauge plate adjacent one edge and a pointer device movable over the protractor and carried by one of the hinge elements whereby to angle the gauge plate to a predetermined degree, a rod disposed within the standard axially thereto and with the rod at its lower end projecting through the plate for rotatably supporting a bearing head, a pair of horizontally disposed rods operable through openings in the bearing head and with the rods being longitudinally adjustable in opposite directions, one rod being provided with a depending and right angularly disposed pin, an acetylene cutting torch adjustably supported upon the pin and with the burner end of the torch being disposed closely adjacent to the pipe section to be cut, the other rod adjacent its terminal end having a bearing, a motor supported upon the bearing, the motor driving a plurality of gears, a friction disk supported upon one of the gears and adapted to bear against the underside of the plate and whereby the arms are rotated in a horizontal path, the first named rod within the standard being provided with carriages having grooved rollers, the rollers engaging trackways within the standard, the upper end of the standard being connected to a cable that traverses a pulley at the upper end of the standard and with the cable at its opposite end being connected to a balance weight, the said balance weight adapted to bias the rod upwardly for shifting the bearing and its oppositely extending rods and the cutting torch toward the underside of the gauge plate and whereby the friction disk serves to rotate the rods and their bearing while being biased upwardly by the weight and whereby the cutting torch and the propulsion device follows the angularity of the gauge plate for moving the torch in a horizontal and angular path around the pipe section to cut wedge-shaped segments from the pipe at an angle in accordance with the angularity of the plate.

3. The structure according to claim 2 wherein the supporting bracket for the standard embraces the standard for outwardly extending arms carried by the bracket that extend upwardly to support the standard upon the trackways, the standard being provided with a rack upon one side that passes through the bracket, a shaft extending through the bracket horizontally thereto, a gear carried by the shaft for meshed engagement with the rack and means whereby the gear is actuated by a motor for causing the standard to rise and fall toward the pipe section to be cut, a reduction gear box supported upon the bracket and with the gear box having a drive pulley and a driving belt extending from the motor to the pulley and with the reduction gearing driving the first named gear by a sprocket chain.

4. The structure according to claim 2 wherein the gauge plate is a circular disk and brace means connected to the marginal portion of the plate and at a right angle to the hinge and whereby the plate is braced in a position of angularity that is determined by the protractor.

5. The structure according to claim 2 wherein the bearing head that is rotatably supported upon the first named rod is provided with adjustable gears for manually shifting the rods outwardly with respect to the head and with the rods being provided with racks for engagement by the gears, the said pin being adjustable upon the first rod for moving the torch toward and from the pipe section to be cut and whereby the torch is adjustable with respect to pipe sections of varying diameters, the said propulsion means carried upon the opposite rod having a bracket that hingedly supports a pair of magnet devices that is adapted to slide upon the undersurface of the plate, the magnets further biasing the friction disks toward the underside of the plate and rollers carried by the magnet bracket to facilitate the sliding movement of the magnets, the rods supporting the cutting torch and the propulsion means being parallel to each other and in a horizontal plane.

References Cited by the Examiner
UNITED STATES PATENTS
2,384,128   9/1945   Nation _____ 266—23

JOHN F. CAMPBELL, *Primary Examiner.*

L. WESTFALL, *Assistant Examiner.*